(12) United States Patent
Harvey

(10) Patent No.: US 9,009,161 B2
(45) Date of Patent: Apr. 14, 2015

(54) DATA PROCESSING

(71) Applicant: Media Science Software Limited, London (GB)

(72) Inventor: Philip David Harvey, Hertfordshire (GB)

(73) Assignee: Datashaka Limited, London (GB)

( * ) Notice: Subject to any disclaimer, the term of this patent is extended or adjusted under 35 U.S.C. 154(b) by 142 days.

(21) Appl. No.: 13/841,065

(22) Filed: Mar. 15, 2013

(65) Prior Publication Data

US 2014/0059077 A1 Feb. 27, 2014

(30) Foreign Application Priority Data

Aug. 22, 2012 (GB) .................................. 1214960.5

(51) Int. Cl.
 *G06F 17/30* (2006.01)
(52) U.S. Cl.
 CPC .... *G06F 17/30289* (2013.01); *G06F 17/30557* (2013.01)
(58) Field of Classification Search
 None
 See application file for complete search history.

(56) References Cited

U.S. PATENT DOCUMENTS

| 2002/0188424 | A1* | 12/2002 | Grinstein et al. | 702/183 |
| 2004/0003132 | A1* | 1/2004 | Stanley et al. | 709/316 |
| 2011/0060753 | A1* | 3/2011 | Shaked et al. | 707/769 |
| 2011/0153603 | A1* | 6/2011 | Adiba et al. | 707/737 |

FOREIGN PATENT DOCUMENTS

WO WO 2012/073526 A1 6/2012

OTHER PUBLICATIONS

International Search Report dated Nov. 26, 2013.
Written Opinion of the International Searching Authority.

\* cited by examiner

*Primary Examiner* — Wilson Lee
(74) *Attorney, Agent, or Firm* — Novak Druce Connolly Bove+Quigg LLP

(57) ABSTRACT

A system for processing arbitrary time-series datasets, the time-series datasets comprising a set of data points, each data point having: i) a time value; ii) a first data value representing the magnitude of a first parameter; and iii) one or more further data values each representing the state of a respective further parameter, and the system comprising: an input configured to receive first and second time-series datasets; a data point analyzer configured to store the content of each data point in a record, each record having: a first field for holding a time value; a second field for holding one or more values of a descriptor; a third field for holding a descriptor; and a fourth field for holding a value, the data point analyzer being configured to store the content of each data point received by the input in a respective record by storing: said time value in the first field; said one or more further data values in the second field; a descriptor of the first value in the third field; and said first value in the fourth field; a storage device comprising a data structure configured to store a plurality of the said records; and a data structure analyzer configured to access the data structure based on the stored time values so as to enable the comparison of data from the first and second datasets.

11 Claims, 2 Drawing Sheets

DATA PROCESSING

BACKGROUND OF THE INVENTION

The present invention relates to a system for data processing.

The area of business data has seen rapid growth in the last few years. Increased computing power combined with availability of an expanding set of analytics tools and services has enabled companies to turn large amounts of data into actionable information that will allow better decision making. This has benefits in any areas that involve the analysis of large quantities of data, such as weather forecasting, financial modelling, complex physical simulations, the modelling of chemical reaction kinetics, human population studies and so on.

Extract, Transform and Load (ETL) is one traditional process used in relation to gathering and storing data using databases, particularly, relational databases. Such relational databases are traditionally concerned with content (i.e. the values in the data and what those values mean) and the relationships and structures within that content. As such, relational databases can have a high design requirement and low reactivity. In most traditional ETL methods, questions to be asked of a data set are specified first and the content based storage schema is designed for those specific questions. For the originally specified questions, queries can be performed relatively quickly but the scope of queries is limited due to the specific design of the storage scheme.

As the amount of data available increases and becomes more complex in structure, the ETL approach described above is proving unable to meet the evolving demands of users, in particular business users who require agility and speed from their data services providers. It is difficult and time consuming to map new, complex and changing data structures on to pre-existing ETL models. The mappings and queries that were defined at the beginning of the process become swiftly out of date as new complex data is required to be processed and this calls for another new and expensive ETL design process to be undertaken.

So called 'Big Data' or 'NoSQL' solutions can be considered as an alternative to the ETL process. Data can be collected as it comes and stored in an unstructured manner. Specific questions are not considered at the start and no structure is added when the data is recorded. Structure may then be added when a question is devised. The data can then be structured according to the question being asked of the recorded data. Querying such a big data set is slower as a structure has to be setup first. Increased speed can be brought to this process through a distributed data processing solution. However, building a distributed, scalable and robust big data processing system is a new and complex field.

Thus, there is a need for an improved system for processing data.

SUMMARY OF THE INVENTION

According to a first aspect of the disclosure there is provided a system for processing arbitrary time-series datasets, the time-series datasets comprising a set of data points, each data point having: i) a time value; ii) a first data value representing the magnitude of a first parameter; and iii) one or more further data values each representing the state of a respective further parameter, and the system comprising: an input configured to receive first and second time-series datasets; a data point analyser configured to store the content of each data point in a record, each record having: a first field for holding a time value; a second field for holding one or more values of a descriptor; a third field for holding a descriptor; and a fourth field for holding a value, the data point analyser being configured to store the content of each data point received by the input in a respective record by storing: said time value in the first field; said one or more further data values in the second field; a descriptor of the first value in the third field; and said first value in the fourth field; a storage device comprising a data structure configured to store a plurality of the said records; and a data structure analyser configured to access the data structure based on the stored time values so as to enable the comparison of data from the first and second datasets.

Suitably, said second field is configured to hold an attribute of the first parameter and a descriptor of the said attribute.

Suitably, the terminal is further configured to access the data structure based on the data stored in the second field so as to enable to comparison of data from the first and second datasets.

Suitably, the terminal is further configured to access the data structure based on the descriptor of the said attribute stored in the second field so as to enable to comparison of data from the first and second datasets.

Suitably, the terminal is configured to send a message to the storage device, the message comprising an indication of a time range and an indication of one or more data values stored in the second field, said access being dependent on the message.

Suitably, the terminal being located remotely from the storage device.

Suitably, the records being stored in the data structure as a single data set.

Suitably, the input is configured to receive more than two time-series datasets and wherein the terminal is configured to access the data structure based on the stored time values so as to enable the comparison of data from more than two datasets.

According to a second aspect of the disclosure there is provided a data processing apparatus for analysing arbitrary time-series datasets, the time-series datasets comprising a set of data points, each data point having: i) a time value; ii) a first data value representing the magnitude of a first parameter; and iii) one or more further data values each representing the state of a respective further parameter, and the apparatus comprising: an input configured to receive first and second time-series datasets; a processor configured to store the content of each data point in a record, each record having: a first field for holding a time value; a second field for holding one or more values of a descriptor; a third field for holding a descriptor; and a fourth field for holding a value, the processor being configured to store the content of each data point received by the input in a respective record by storing: said time value in the first field; said one or more further data values in the second field; a descriptor of the first value in the third field; and said first value in the fourth field; and an output configured to send each data record to a storage device.

According to a third aspect of the disclosure there is provided a method of analysing arbitrary time-series datasets irrespective of the structure of the said datasets; the time-series datasets comprising a set of data points, each data point having: i) a time value; ii) a first data value representing the magnitude of a first parameter; and iii) one or more further data values each representing the state of a respective further parameter, and the method comprising: receiving first and second time-series datasets; storing the content of each data point in a record, each record having: a first field for holding a time value; a second field for holding one or more values of a descriptor; a third field for holding a descriptor; and a fourth field for holding a value, storing the content of each data point received by the input in a respective record by storing: said time value in the first field; said one or more further data values in the second field; a descriptor of the first value in the third field; and said first value in the fourth field; storing a plurality of the said records in a data structure; and accessing the data structure based on the stored time values so as to enable the comparison of data from the first and second datasets.

BRIEF DESCRIPTION OF THE DRAWINGS

The present invention will now be described by way of example with reference to the accompanying drawings. In the drawings.

DETAILED DESCRIPTION OF THE INVENTION

The system described below provides a semi-structured solution that allows for the content of the data to change, new data sources to be added and existing data to be enriched by comparison or association with other data. It also imposes a structure that makes it much easier to query the data. The structure is imposed around the nature (i.e. its form) of the data not its contents. This allows for easier comparison of data from different sources and different data sets, and differs fundamentally from that of the ETL and big data solutions given above.

Figure 1:
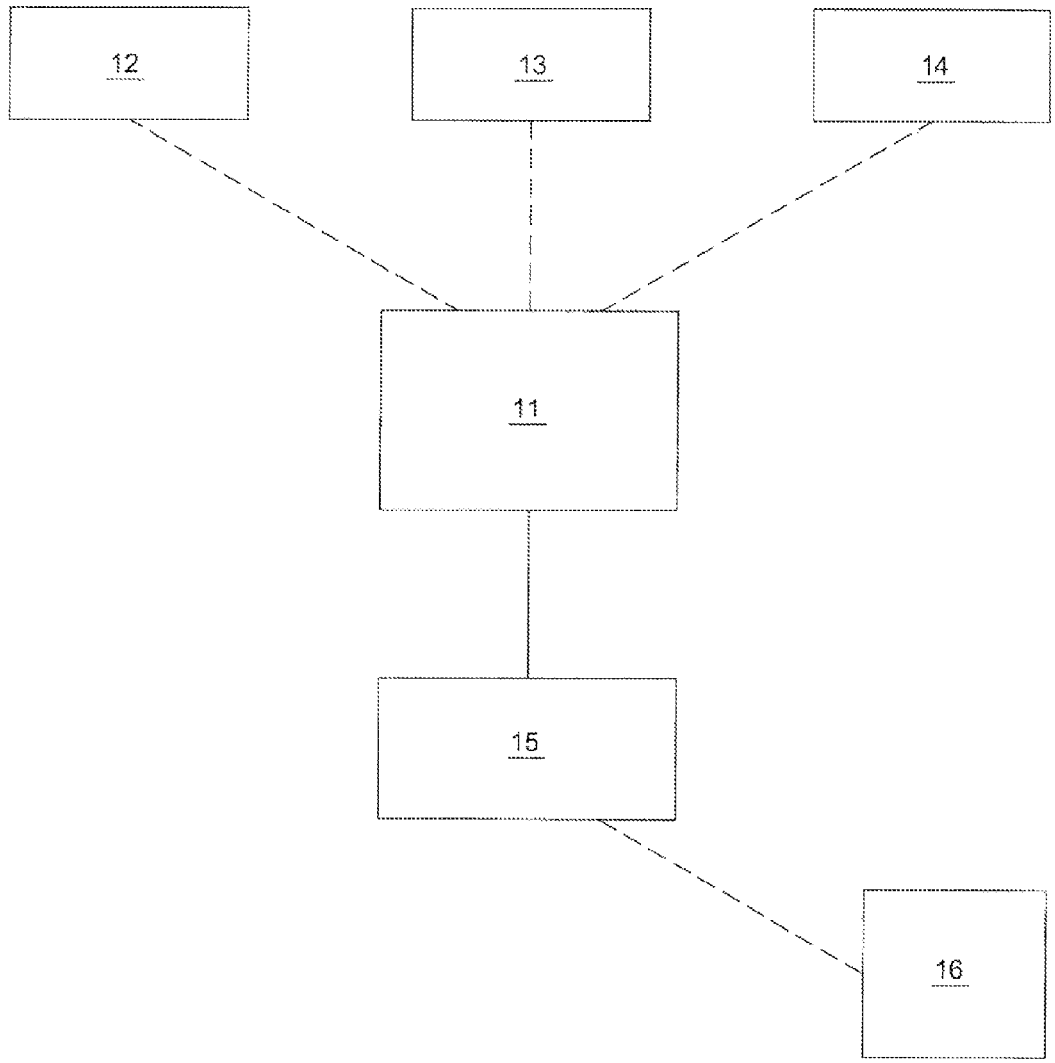
FIG. 1 shows an example of a data processing system.

A system environment in which embodiments of the present invention may be practiced is illustrated in FIG. 1. The system includes a unifier 11, which may be a unification pipeline that exists on one or more computers or servers. The computer could be a stand-alone machine or it could be connected to an intranet network and/or the internet. In this example the unifier 11 is connected to data sources 12, 13 and 14 via intranet and/or internet connections. The data sources 12, 13 or 14 may be computers, servers, mobile devices or any other device capable of sending a specified data set on request.

The data sources 12, 13 and 14 may provide datasets of different types, formats, volumes and nature. Each dataset could be static or could be updated from time to time. Taken together, the datasets from the various sources can be randomly structured or unstructured and arbitrary. For example, the various data sources could be of the following types:

Generator: A data source of this type generates the data that it holds. The data is created by the generator operating or doing business. An example of a generator source is the Meteorological Office, which generates weather data. In that example, the weather data is captured by instruments and then stored within the generator's system. A generator captures data from the real world and stores it digitally. Facebook and Twitter are other examples of generators which generate data about the actions performed by their users. A single data capture instrument such as a data-logging thermometer or strain gauge could act as a generator.

Record Point: A data source of this type records data that it holds. Examples include a web analytics package or an adserver. The key difference between a source of this type and a generator is that it can record data about digital activity. This can be achieved with specialist recording devices, such as a piece of specialist javascript. The Microsoft adserver Atlas and Google Analytics are examples of record points, which record the activities of users on a different system. Other examples are a database of chemical reaction or a market research company asking questions of shoppers leaving a retail outlet.

Aggregator: A data source of this type brings together similar sets of data into one place. It aggregates data specifically based on content. Aggregators are often linked to other tooling sets for performing specific actions using the data they hold. An example of an aggregator is Marin. Marin aggregates pay-per-click data from search engines and Facebook. Another example is a database that automatically aggregates weather recordings from multiple locations into a common corpus.

Datasets from the data sources 12, 13, 14 can be sent to the unifier 11, which can comprise an input to receive the datasets. The datasets may be sent in response to a request by the unifier 11 or by another entity. The input could be a network port or other data interface. The data may be sent via various means such as and API, email, FTP or HTTP. If necessary, the input could be configured to transform or process received data in to a form that is accessible to the unifier 11. The unifier 11 can unify the data from the various data sources to provide a unified dataset. The unification process performed by the unifier 11 is described in more detail later. The unified data can be stored in a data store 15. The data store 15 may be one or more computers and/or servers which may be local or remote to the unifier 11. The unified data may be distributed across multiple data stores and/or stored in the cloud.

A client system 16 may access the unified data in data store 15. The client system 16 may be local or remote to the data store 15 and unifier 11. The client system 16 may remotely access the data store 15 by sending and receiving one or more messages via an intranet or internet connection. The client system 16 may comprise a data structure analyser (which can be an application) which provides access to the stored unified data (which may be stored in a data structure in the data store 15). Via the data structure analyser, a user can query the unified data and analyse the received response. The data structure analyser may be an API which can allow another application running on the client system to access the unified data. Providing access to the unified data in the data store 15 allows the client system 16 to compare data from the various data sources 12, 13, 14 (as described later in more detail).

The unifier 11 is now described in more detail. The unifier 11 can receive a plurality of datasets from a variety of data sources, as mentioned above. Each received data set can comprise a plurality of data points. Each received dataset can be analysed for time-series data. Time-series data can comprise values of parameters that change over time (for example, daily sales figures, average daily temperatures, etc.). The unifier 11 may comprise a data point analyser that can analyse the dataset to identify data that corresponds to a series of values with a time associated with each value. Thus, the unifier 11 can identify data points that have a time and a value associated therewith. In each data point the value can represent a magnitude of a parameter at a particular time. The magnitude of that parameter may change over time and, in a time series data set, this can be represented by the change in value over time.

Data points can also be analysed by the data point analyser to identify other data values that are associated with it. Some of these other data values may represent a state associated with a data point to help give some context to the data point and thus help to give meaning to the value that changes over time (these values are hereinafter referred to as context). There may be more than one context value associated with or comprised within each data point. For example, a data point may be associated with or have a context value that describes an attribute of the data point and a context value that describes that attribute.

The data point analyser may identify another data value as being associated with a data point. This data value (hereinafter referred to as signal) may be a signal or descriptor which names or describes the value within a data point (i.e. the value that changes over time in time series data).

Thus the unifier 11 can be configured to identify data points that have values associated with time, context, signal and value (T, C, S and V). Each identified T, C, S and V value can be appropriately tagged or assigned to be a time, context, signal or value for each data point.

TCSV values for each data point can be stored in a data record. The data record may comprise a first field to hold a time value, a second field to hold one or more context values, a third field to hold a signal and a fourth field to hold a value. The data point analyser may store the identified values for each data point in a data record. Each of the T, C, S and V values of a data point may be stored in respective first, second, third and fourth fields of each data record (the T, C S and V values may be provided in individual fields in any order). This imposes a TCSV storage scheme for each data point in a data set. Imposing a TCSV storage scheme on the data in each data set allows the data to be easily stored and accessed and helps to efficiently compare data between different data sets. Further benefits of imposing the TCSV storage scheme on various data sets will be detailed later.

The following describes some examples of the type of data values that may be stored according to the TCSV storage scheme and some benefits of using each of T, C, S and V in the storage scheme:

Time (T). A value stored as time may represent the date and/or time at which a particular value was recorded or when an event related to that value occurred (e.g. when the magnitude of a parameter was measured). A time value can range from a high precision, e.g. on the scale of milliseconds, to a lower precision, e.g. on the scale of days, weeks, months or years. Time itself has well known aggregation relationships, which can be useful when data is stored as these relationships can be added to enrich a data set automatically. It may also be necessary to break down the aggregation relationships and specify custom time aggregation relationships to suit specific cases.

Context (C). A value stored as Context may represent non-numeric, or non-mutative numeric data (such as numeric identifiers or geographic coordinates) that can help give meaning to the mutative numeric values that change over time. For example, if you consider this data [2012-04-17, Noah, 3.638] [2012-04-22, Noah, 3.5] there are three distinct and recognisable parts. A date, this is the Time for the record. A name, this is a piece of text (a string), this is the Context for the record. There is also a number that changes (where C may not) as the date changes. This number is the Value (V). Context may have a sub-aspect in some scenarios. This is Context Type (Ct). Context Type may be a type or category or grouping of Context that can help describe the Context or link various pieces of Context together. For example, for the following example data record: [date=2012-04-17T02:52:00, name=Noah, weight=3.638] the entity 'name' is a value that describes a related value 'Noah'. In this case 'name' is the Context Type. There may be many different possible names, which are all related by the fact that they are names.

Each data point in a dataset may have the same Context value. Thus the Context may be stored as a unique entry. In this case, the same item might not be stored more than once, or could be entirely implicit. Similarly, Context Type can also be stored uniquely. Therefore Context and Context Type as a pair can be stored uniquely and may only appear once in a data store. A record can contain a link in the second field that links the record to the uniquely stored Context. Similarly a record that has a value associated to a Context-Context Type pair can contain a link in the second filed to a uniquely stored Context-Context Type pair.

Signal (S). A value stored as a Signal may be a name or descriptor of the value that changes over time. In the example given above, the Signal would be 'weight'. The signal can be considered as a special case of Context. The Signal can be considered as a separate element from Context because it carries features that can describe what can be done to the values of that Signal mathematically. For example, in the case that a Value is a percentage, the Signal may be "change", and thus when carrying out certain calculations to carry out a comparison, the calculation can account for mathematical expression of the Value.

In some cases, a data point in a received dataset might not contain a Signal. In these cases, the Signal may be derived from the Context, or implied, and a Signal value can be added to the third field in the data record.

Similarly to Context, Signals can be stored uniquely with each record containing a link to the stored Signal.

Value (V). A stored Value can be the actual numeric or text value that changes over time. In a time series data set, this is the value that changes over time.

Time can connect the time-series datasets unified under the TCSV scheme. This is, in some cases, the most basic and important natural connection that allows unification to occur. One reason that the datasets can be unified under the TCSV scheme is because they are time-series: they have values that change over time. Context and Signal can give meaning to those values.

The unifier 11 can impose the TCSV storage scheme on the datasets received from the various data sources 12, 13, 14. It is configured to do this irrespective of the significance of the dataset, provided it is a time-series dataset. The TCSV storage scheme can be imposed on each received data set by storing the values associated with each data point (that is in each data set) in a data record that is structured with fields that are appropriate for holding T, C, S and V values. As mentioned above, the data record can comprise a first field for holding a time value (T), a second field for holding or more values of a descriptor, such as the context values (C, Ct), a third field for holding another descriptor such as the signal value (S) and a fourth field for holding a value (V). The T, C (and Ct), S and V values associated with each data point can be stored in the first, second, third and fourth fields respectively of a data record.

Each data record can be sent to a data store 15 that can store the records in a data structure. The data structure can be structured according to the structure of the data records. Thus the data structure can store the records according to the TCSV storage scheme. This provides a common structure in which the data from the various data sources can be stored. This helps to efficiently access the data from the various sources as the unified data can be queried as a single dataset rather than having to query multiple separate, different and distinct datasets with differing structures.

The data structure can be accessed so as to enable the comparison of data from the plurality of data sources. The data from the various data sources can be unified and stored under the TCSV storage scheme in the data structure, as detailed above.

This allows the data from the various sources to be efficiently queried as the data is represented in a single dataset, which allows for easy and efficient comparison of the data from the various datasets. The data from the various sources are common in that they are time-series datasets. Thus, the various datasets may have common or overlapping time values or ranges, which can allow for the datasets, stored under the unified TCSV scheme, to be compared. Using the TCSV scheme, comparison between the various datasets may additionally or alternatively be based on any common context and/or context types and/or signals.

New data records can be added to the data structure to add to already existing unified data. The existing stored data in the data structure can be efficiently enriched because new data records have a structure common to the existing data. The TCSV storage scheme can ensure comparability within the stored data, thus the enrichments can instantly become available when querying the data structure.

Figure 2:
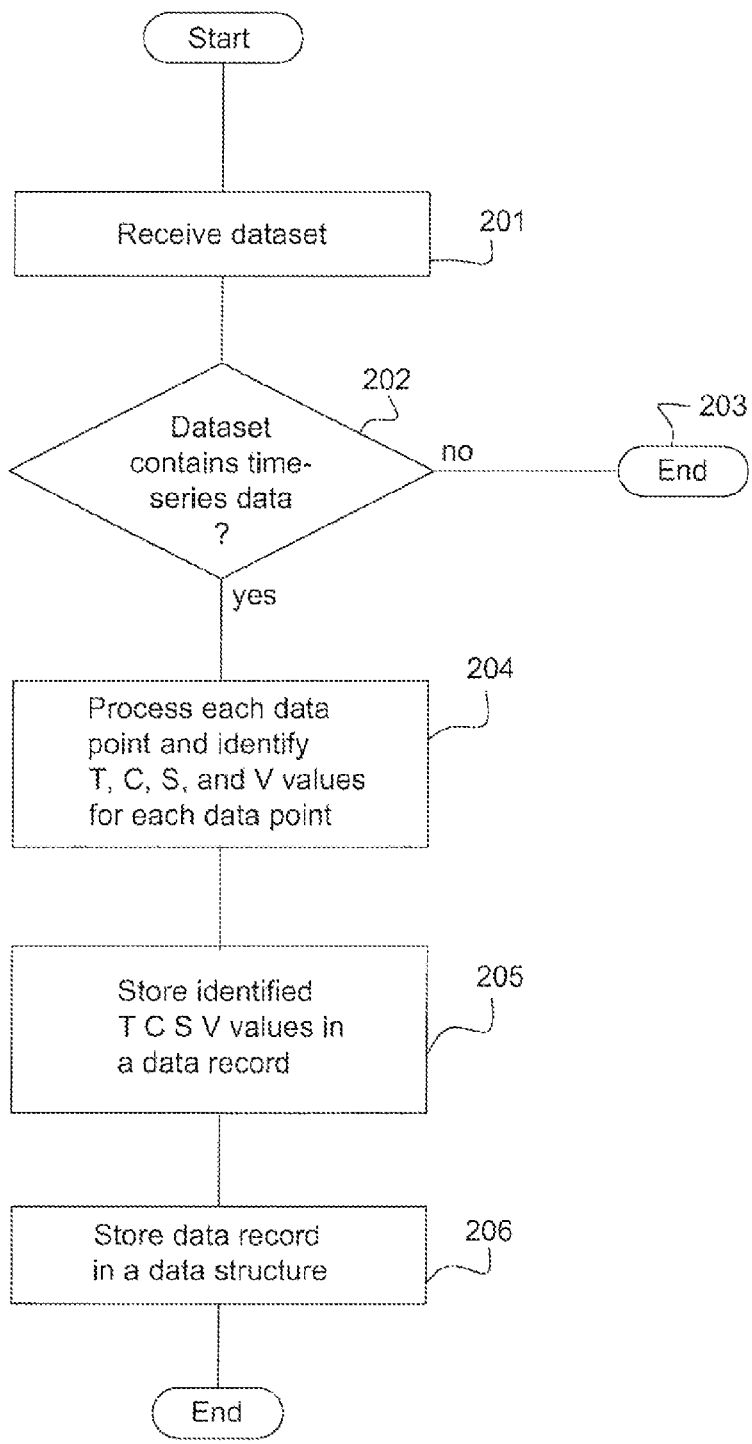
FIG. 2 shows an example of a process for storing data under a storage scheme.

FIG. 2 diagrammatically illustrates an exemplary process in which the TSCV storage scheme is imposed on each dataset received from a data source.

At step 201, a dataset is received. The datasets may be received at an input of a data processing apparatus such as the unifier 11, described above.

At step 202, the dataset is analysed for time-series data. If a received dataset does not contain time-series data, the process ends at step 203. If time-series data is detected, the process moves on to step 204. The process can continue to step 204 for the time-series data irrespective of the structure or format of the dataset or the parameter or measure that the dataset relates to.

At step 204, each data point in the time-series dataset is processed. Each data point is analysed for content related to T, C, S and V, as detailed above. The T, C, S and V values for each data point are identified and the process moves on to step 205. If the analysis fails to identify a C and/or S for the data point, an alert may be generated to indicate the failure to an administrator. In the event of such a failure, the process may still carry on with null values added to the second and/or third fields in step 205. These null values may then be appropriately replaced by the administrator who has been alerted to the failure.

At step 205, the T, C, S and V values identified for each data point is stored in a respective data record. As mentioned above, a data record comprises first, second, third and fourth fields in which the respective T, C, S and V values are stored.

At step 206, data records comprising the T, C, S and V values are sent to a data structure to be stored. As mentioned above, data records can be added to the data structure that may already store other such data records.

At step 207, the process end. This process can be carried out on a plurality of datasets received from various data sources. This process provides one way of semi-structuring the unstructured datasets received from the various sources. Semi-structuring allows for flexibility within the data store itself as well as allowing the data to be enriched later. Storing data in a semi-structured manner also allows for easier comparison of data from various different datasets.

The semi-structuring of unstructured or differently structured data provided by the TCSV scheme allows the data to be queried in an efficient, yet flexible manner. A user can query the data using simpler queries and is therefore provided with faster access to the semi-structured data compared with unstructured data. Thus, the computer processing overhead required is reduced when compared with querying and fetching the data from unstructured store. This is especially advantageous in the area of Big Data where, due to the large amount of data, processing of queries and fetching data can be slow.

Also, by semi-structuring, the user is able to query the data in a more flexible manner with a wider breadth of queries as the user is not restricted by a high level of structure. Furthermore, storing data in a highly structured manner requires complicated conversion and re-transformation of each received dataset to fit the data in the highly structured storage. Semi-structuring by imposing the TCSV scheme allows for simpler, less complicated conversion of the data. Semi-structuring data according to TCSV is particularly efficient because fewer conversion steps are required to fit the time-series data (which contains T and V values) into the TCSV scheme. By providing C and S values, the associated T and V values are given meaning and are not just arbitrary numbers. This allows the T and V values to be correctly analysed and compared against other T and V values.

Another advantage of semi-structuring data and unifying it under the TCSV scheme is the ability to be agnostic to where that data is stored. There are many different kinds of data storage available, each varying in performance and cost. By being able to be agnostic as to where the data is stored, it is possible to take advantage of different kinds of data storage and work around the disadvantages. This can be made possible by, for example, Resource Description Framework (RDF) storage where the Uniform resource identifier (URI) of a particular node can represent data stored on a different system. In the case of the large volume of 'Big Data' it may be impractical to store the complete data set in one kind of storage and it may be more suitable to use a distributed storage system. As long as the data is stored with the correct links to other data sets and the data access layer of the application (such as an application in a client system 16) knows how to access the particular kind of data store then, because the data is unified, all the data can be used as if it was stored in one place.

Another advantage relates to the field of Data Curation. Data Curation is concerned with making sure that the data you want is where you want it when you want it to be there. This can involve: making sure that any automated harvesting of data is running correctly and no external factors have prevented data from reaching the core system; and checking the integrity of the data and maintain the internal quality and consistency of the data. Data unified under the TCSV scheme becomes a lot easier to curate while maintaining flexibility to change. When data is stored in a highly structured way, curation is inflexible. With a completely unstructured solution, any data is allowed in and inconsistencies are only found when the data is queried.

The unifier 11 described above is suitably incorporated within a computing-based device. The computing-based device may be an electronic device. Suitably, the computing-based device comprises one or more processors for processing computer executable instructions to control operation of the device in order to implement the processes described herein. The computer executable instructions can be provided using any computer-readable media such as a memory. Further software can be provided at the computing-based device to implement the processes described herein. The methods described herein may be performed by software in machine readable form on a tangible storage medium.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A system for processing arbitrary time-series datasets, the time-series datasets comprising a set of data points, each data point having: i) a time value; ii) a first data value representing the magnitude of a first parameter; and iii) one or more further data values each representing the state of a respective further parameter, the system comprising:
   a processor;
   an input configured to receive first and second time-series datasets; a data point analyser configured to store the content of each data point in a record, each record having:
   a first field for holding a time value;
   a second field for holding one or more values of a descriptor;
   a third field for holding a descriptor; and
   a fourth field for holding a value, the data point analyser being configured to store the content of each data point received by the input in a respective record by storing:
   said time value in the first field; said one or more further data values in the second field;
   a descriptor of the first value in the third field; and said first value in the fourth field;
   a storage device comprising a data structure configured to store a plurality of the said records; and
   a data structure analyser configured to access the data structure based on the stored time values so as to enable the comparison of data from the first and second datasets.

2. The system of claim 1, wherein said second field is configured to hold an attribute of the first parameter and a descriptor of the said attribute.

3. The system of claim 1 wherein the data structure analyser is further configured to access the data structure based on the data stored in the second field so as to enable to comparison of data from the first and second datasets.

4. The system of claim 2 wherein the data structure analyser is further configured to access the data structure based on the descriptor of the said attribute stored in the second field so as to enable to comparison of data from the first and second datasets.

5. The system of claim 1 wherein the data structure analyser is configured to send a message to the storage device, the message comprising an indication of a time range and an indication of one or more data values stored in the second field, said access being dependent on the message.

6. The system of claim 1, wherein the data structure analyser is located remotely from the storage device.

7. The system of claim 1, wherein the records are stored in the data structure as a single data set.

8. The system of claim 1, wherein the input is configured to receive more than two time-series datasets and wherein the data structure analyser is configured to access the data structure based on the stored time values so as to enable the comparison of data from more than two datasets.

9. A data processing apparatus for analysing arbitrary time-series datasets, the time-series datasets comprising a set of data points, each data point having: i) a time value; ii) a first data value representing the magnitude of a first parameter; and iii) one or more further data values each representing the state of a respective further parameter, the apparatus comprising:
   an input configured to receive first and second time-series datasets;
   a processor configured to store the content of each data point in a record, each record having:
   a first field for holding a time value;
   a second field for holding one or more values of a descriptor;
   a third field for holding a descriptor; and
   a fourth field for holding a value,
   the processor being configured to store the content of each data point received by the input in a respective record by storing: said time value in the first field; said one or more further data values in the second field; a descriptor of the first value in the third field; and said first value in the fourth field; and
   an output configured to send each data record to a storage device.

10. A computer implemented method of analysing arbitrary time-series datasets irrespective of the structure of the said datasets; the time-series datasets comprising a set of data points, each data point having: i) a time value; ii) a first data value representing the magnitude of a first parameter; and iii) one or more further data values each representing the state of a respective further parameter, the method comprising:
    receiving, by a processor, first and second time-series datasets;
    storing, by a processor, the content of each data point in a record, each record having:
    a first field for holding a time value;
    a second field for holding one or more values of a descriptor;
    a third field for holding a descriptor; and
    a fourth field for holding a value,
    storing, by a processor, the content of each data point received by the input in a respective record by storing: said time value in the first field; said one or more further data values in the second field; a descriptor of the first value in the third field; and said first value in the fourth field;
    storing, by a processor, a plurality of the said records in a data structure; and
    accessing, by a processor, the data structure based on the stored time values so as to enable the comparison of data from the first and second datasets.

11. The system of claim 2, wherein the data structure analyser is further configured to access the data structure based on the data stored in the second field so as to enable comparison of data from the first and second datasets.

* * * * *